ent Office 3,649,497
Patented Mar. 14, 1972

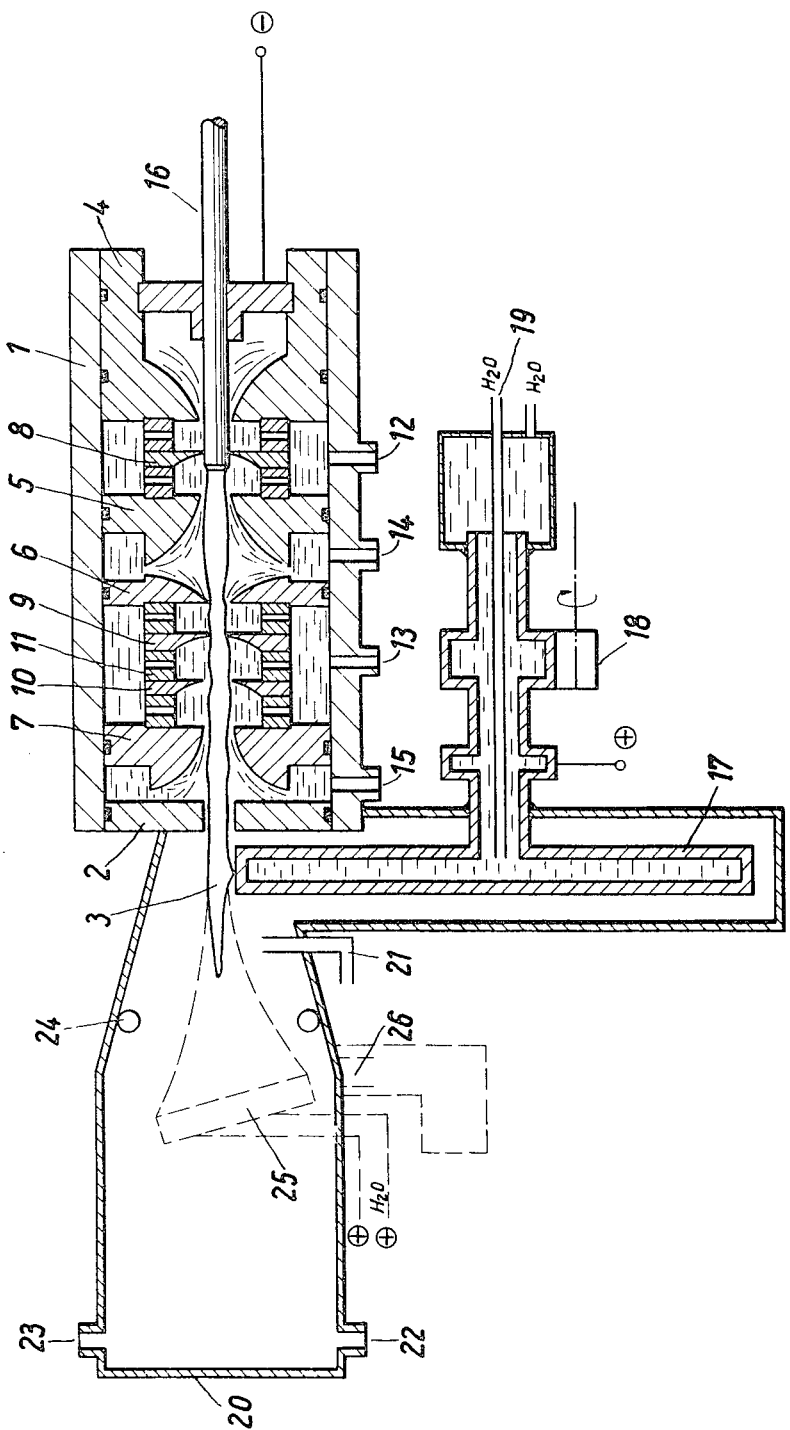

3,649,497
PROCESS FOR CARRYING OUT CHEMICAL
REACTIONS
Tibor Kugler, Sins, and Jakob Silbiger, Basel, Switzerland, assignors to Lonza, Ltd., Gampel, Valais (Direction Basel), Switzerland
Filed Dec. 17, 1969, Ser. No. 885,927
Claims priority, application Switzerland, Dec. 27, 1968, 19,259/68; Apr. 1, 1969, 4,949/69
Int. Cl. C01b *31/30;* C01g *23/02*
U.S. Cl. 204—164                                                                                 11 Claims

ABSTRACT OF THE DISCLOSURE

Chemical reactions are carried out under the thermal action of the plasma of an arc discharge by causing a reactant containing a metal or metalloid to swirl and form a vortex in the liquid state so as to at least partially form and stabilise a plasma, and said reactant reacts in the plasma state to form a reaction product containing at least one metal or metalloid component. Chemical reactions which may be carried out are for example reduction, cracking reactions, and carbide formation.

---

This invention relates to a process for carrying out chemical reactions in which the reactants are reacted under the thermal action of the plasma of an arc discharge and the plasma is stabilised by means of a swirling liquid, which partially vaporises in the plasma.

To produce a reaction product containing at least one metal or metalloid component in accordance with the invention, a reactant containing the metal or metalloid is swirled in the liquid phase to stabilise and at least partially form the plasma, and is reacted in the plasma state.

The process in accordance with the invention is described in more detail by examples of application to reduction, cracking reactions and carbide formation. In these examples the process in accordance with the invention is carried out by means of a plasma reactor which is shown diagrammatically in longitudinal section in the sole figure of the accompanying drawing.

The plasma reactor shown has a discharge chamber with a cylindrical sleeve 1, a front nozzle 2 through which flows a plasma jet 3, and a rear wall 4. Three diaphragms 5, 6 and 7 spaced apart from one another and from the nozzle 2 and the rear wall 4, are arranged in the discharge chamber. A diaphragm 8 is arranged between the rear wall 4 and the diaphragm 5, coaxially to the sleeve 1, and two diaphragms 9 and 10 are arranged between the diaphragms 6 and 7, coaxially to the sleeve 1. The external diameter of the diaphragms 8, 9 and 10 is smaller than the internal diameter of the sleeve 1. The aperture diameter of the diaphragm 10 is about the same as that of the diaphragms 5, 6 and 7, and the aperture diameter of the diaphragms 8 and 9 is somewhat smaller. The diaphragm 8 is separated from the rear wall 4 and the diaphragm 5, and the diaphragms 9 and 10 are separated from one another and from the diaphragms 6 and 7 by rings 11 whose external diameter corresponds to that of the diaphragms 8, 9 and 10. The internal diameter of the rings 11 is greater than the aperture diameter of the diaphragms 5 to 10, whereby a plurality of annular spaces bonded axially by every two adjacent diaphragms and radially by a ring are formed for the liquid vortex for stabilising the arc discharge. The rings 11 have continuous bores which are tangential to their aperture circumference. Pipes 12 and 13 for the liquid used to produce the liquid vortex lead into the annular spaces between the diaphragms 8, 9 and 10, and between the rings 11 and the sleeve 1. Each of the diaphragms 5, 6 and 7 has an axially directed circular lip. Outlets 14 and 15 for the non-vaporised portion of the liquid, which is cooled and is led together with fresh liquid to the inlets 12 and 13, lead from the annular spaces between these circular lips and the sleeve 1. A rod cathode 16, e.g. of graphite, is inserted coaxially in the rear wall 4. A hollow, water cooled anode 17 in the form of a circular disc rotates in front of the nozzle 2 and is made of for example copper, carbon or aluminum, depending on the reaction to be carried out. The axis of the anode 17 is parallel to the axis of the discharge chamber and the end of the anode 17 is about the same distance from the axis of the discharge chamber as the circumference of the aperture of the nozzle 2. The drive means and cooling system for the anode 17 are numbered 18 and 19 respectively. The anode 17 is arranged at the mouth of a reaction chamber 20, which for certain reactions is made of for example ceramic, oxidic material, and is joined to the nozzle 2 and provided with a pipe 21 and two outlet connections 22 and 23. The reaction chamber 20 can be thermally insulated for certain reactions, and can be provided with heating or cooling means, a ring shower 24 for quenching the reaction products, a fixed water cooled second copper anode 25, and an outlet 26.

REDUCTION

For the reduction of $TiCl_4$ to $TiCl_3$, the plasma reactor described with reference to the drawing is employed using a copper anode 17 but without the parts 24, 25 and 26.

One of the reactants, $TiCl_4$, is passed to the inlets 12 and 13, flows through the tangential bores in the rings 11 and forms a liquid vortex in the discharge space, being partially vaporised to form the plasma gas. Hydrogen as the second reactant is passed through the pipe 21 into the reaction chamber 20. The arc discharge is produced for example with a current of 500 amps. The plasma jet 3 has for example a diameter of 7 to 13 mm. and is stabilised by the liquid vortex comprising $TiCl_4$.

Two successive step-wise reactions take place. In the first reaction titanium carbide and chlorine are formed from the carbon of the cathode and a part of the $TiCl_4$ in the space between the lips of the diaphragms 5 and 6. These reaction products are withdrawn from the outlet 14 together with $TiCl_4$, and are chilled. The amount of reaction products depends, among other things, on the size of the space between the lips of the diaphragms 5 and 6 and on the withdrawal rate. The second reaction takes place at the anode 17 according to the equation

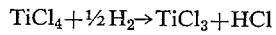
$$TiCl_4 + \tfrac{1}{2} H_2 \rightarrow TiCl_3 + HCl$$

The reaction products are withdrawn at 22 and 23.

For the reduction of $TiCl_4$ to Ti the plasma reactor is used with the aluminum cathode 17, but without the parts 21, 24, 25 and 26. Liquid Ti and aluminium chloride gas are thus formed, and the anode is gradually consumed.

CRACKING REACTION

For the cracking reaction of $SiCl_4$ the plasma reactor is used with the copper anode 17, the second copper anode 25 and the outlet 26, but without the shower 24. A voltage is applied to the second anode 25 which is more positive than the voltage at the anode 17, so that the discharge extends from the cathode 16 to the anode 17, and from this further to the second anode 25.

$SiCl_4$ is led through the inlets 12 and 13 for the formation and stabilisation of the plasma, and the current (about 500 amps.) and the aperture diameters of the diaphragms 5 to 10 are chosen so that the plasma gas attains the required temperature for carrying out the reaction $SiCl_4 \rightarrow Si + 2Cl_2$. The cracking reaction takes place in the reaction chamber 20. The silicon metal condenses on the second anode 25, drains off from this, and is removed via the outlet 26. The remaining product, gaseous chlorine, is withdrawn through the outlets 22 and 23. A recombination in the reaction chamber 20 is prevented to a large extent by that part of the arc discharge which extends between the anode 17 and the second anode 25.

CARBIDE FORMATION

To produce titanium carbide, the described plasma reactor is used with a carbon anode 17 and cooled reaction chamber 20, but without parts 21, 25 and 26, and with the shower 24 and an additional nozzle (not shown), which is directed opposite the anode 17 onto the plasma jet 3.

Titanium tetrachloride is passed through the pipes 12 and 13 as stabilising liquid and for the formation of the plasma. A liquid hydrocarbon, for example a hydrocarbon having an average carbon atom content of 10 to 15 C atoms per molecule, is passed through the additional nozzle to the plasma jet 3. The reaction

$TiCl_4 + \text{hydrocarbon} \rightarrow TiC + \text{hydrochloric acid}$ takes place. The resulting reaction mixture is chilled with a mixture comprising equal parts of hydrogen and methane by means of the ring shower 24. 10 kg. of TiC having a particle size of less than 0.001 mm. were obtained at a burner output of approximately 120 kw. per hour in this way.

We claim:
1. A process for reacting a compound, having a component selected from the group containing metals and metalloids and at least one further component, with another reactant under the thermal action of the plasma of an arc discharge, comprising
   swirling said compound in the liquid state containing a metal or metalloid component and forming at least one vortex around the plasma arc discharge path,
   establishing an arc discharge and stabilizing it with said vortex,
   evaporating said compound containing a metal or metalloid component at the inside of the vortex to form at least a part of the plasma of the arc discharge,
   confining said arc discharge to increase the energy density thereof, and
   introducing said another reactant, which is reactive with said further component at high temperatures, into the plasma of said arc discharge, whereby said compound in plasma state and said another reactant are reacted together.

2. A process for the reduction of a liquid compound of a halogen and a component selected from the group containing metals and metalloids under the thermal action of the plasma of an arc discharge, comprising
   swirling said liquid compound and forming at least one vortex around the plasma arc discharge path,
   establishing an arc discharge and stabilizing it with said vortex,
   evaporating said compound of a halogen and a metal or metalloid component at the inside of the vortex to form at least a part of the plasma of the arc discharge,
   directing a gaseous reactant, which is reactive with said halogen component at plasma temperatures, into the plasma of said arc discharge, thereby reacting said gaseous reactant with at least a part of the halogen of the plasma of the arc discharge, and
   collecting a reduction product of said liquid compound.

3. A process as set forth in claim 2, wherein said liquid compound is titanium tetrachloride, said gaseous reactant is hydrogen and said reduction product is titanium trichloride.

4. A process as set forth in claim 3, wherein said arc discharge is established between a copper anode and a carbon cathode.

5. A process for the cracking reaction of a liquid compound of a halogen and a compound selected from the group containing metals and metalloids under the thermal action of the plasma of an arc discharge between a cathode, a first anode and a second anode comprising,
   applying a potential to the second anode that is more positive than the potential of said first anode and establishing an arc discharge from the cathode over the first anode and to the second anode,
   swirling said liquid compound and forming at least one vortex around the arc discharge path between the cathode and the first anode thereby stabilizing said arc discharge,
   confining said arc discharge to concentrate the plasma energy to obtaining a plasma temperature required for cracking reaction of said compound, and
   condensing said metal or metalloid component at the second anode.

6. A process as set forth in claim 5, wherein said liquid compound is silicon tetrachloride and said component is silicon.

7. A process as set forth in claim 6, wherein said arc discharge is established between a carbon cathode and first and second anodes of copper.

8. A process for the formation of carbide under the thermal action of the plasma of an arc discharge comprising,
   establishing an arc discharge between a cathode and an anode,
   swirling a liquid compound, consisting of a halogen and a metal or metalloid component, and forming at least one vortex and around the arc discharge between the anode and the cathode thereby stabilizing said arc discharge,
   evaporating said liquid compound of a halogen and a metal or metalloid component at the inside of the vortex to form at least a part of the plasma of the arc discharge,
   directing a liquid hydrocarbon to the plasma of said arc discharge, and
   quenching the plasma hydrocarbon composition thereby obtaining the carbide of said metal or metalloid and a compound of hydrogen and said halogen.

9. A process as set forth in claim 8, wherein said liquid compound is titanium tetrachloride, and said hydrocarbon has an average carbon atom content of 10 to 15 C atoms per molecule, said carbide is titanium carbide, and said compound of hydrogen and halogen is hydrochloric acid.

10. A process as set forth in claim 8, wherein said cathode is of carbon.

11. A process as set forth in claim 8, wherein the quenching step the plasma and hydrocarbon composition is chilled by means of a mixture of hydrogen and methane.

References Cited

UNITED STATES PATENTS

| | | | |
|---|---|---|---|
| 2,854,392 | 10/1958 | Tokumoto et al. | 204—164 |
| 3,003,061 | 10/1961 | Berghaus et al. | 250—49.5 |
| 3,438,720 | 4/1969 | Cleaver | 204—164 |
| 3,494,762 | 2/1970 | Ishibashi | 204—164 |
| 3,516,921 | 6/1970 | Manion et al. | 204—311 |
| 3,532,462 | 10/1970 | Zirngibl et al. | 204—164 X |

FOREIGN PATENTS

| | | | |
|---|---|---|---|
| 1,294,283 | 4/1962 | France | 204—164 |
| 1,065,385 | 9/1959 | Germany | 204—164 |

F. C. EDMUNDSON, Primary Examiner

U.S. Cl. X.R.

23—205, 87T

UNITED STATES PATENT OFFICE
CERTIFICATE OF CORRECTION

Patent No. 3,649,497        Dated  March 14, 1972

Inventor(s) TIBOR KUGLER and JAKOB SILBIGER

It is certified that error appears in the above-identified patent and that said Letters Patent are hereby corrected as shown below:

Page 1, Column 1, in the heading, line 8, change

"Dec. 27,1968" to --Dec. 24,1968--.

Signed and sealed this 17th day of October 1972.

(SEAL)
Attest:

EDWARD M. FLETCHER, JR.
Attesting Officer

ROBERT GOTTSCHALK
Commissioner of Patents